US009856376B2

(12) United States Patent
Sun et al.

(10) Patent No.: US 9,856,376 B2
(45) Date of Patent: *Jan. 2, 2018

(54) AROMATIC POLYAMIDE FILMS FOR SOLVENT RESISTANT FLEXIBLE SUBSTRATES

(75) Inventors: Limin Sun, Copley, OH (US); Dong Zhang, Uniontown, OH (US); Frank W. Harris, Boca Raton, FL (US); Jiaokai Jing, Uniontown, OH (US)

(73) Assignee: Akron Polymer Systems, Inc., Akron, OH (US)

(*) Notice: Subject to any disclaimer, the term of this patent is extended or adjusted under 35 U.S.C. 154(b) by 1042 days.

This patent is subject to a terminal disclaimer.

(21) Appl. No.: 13/528,047

(22) Filed: Jun. 20, 2012

(65) Prior Publication Data

US 2013/0011642 A1 Jan. 10, 2013

Related U.S. Application Data

(60) Provisional application No. 61/504,607, filed on Jul. 5, 2011.

(51) Int. Cl.
*C08L 77/10* (2006.01)
*C08J 5/18* (2006.01)
*C08G 69/32* (2006.01)

(52) U.S. Cl.
CPC .............. *C08L 77/10* (2013.01); *C08G 69/32* (2013.01); *C08J 5/18* (2013.01); *C08J 2377/10* (2013.01); *Y10T 428/2495* (2015.01); *Y10T 428/269* (2015.01)

(58) Field of Classification Search
CPC .... C08L 77/10; C08L 63/00; Y10T 428/2495; Y10T 428/269
USPC ................... 428/213, 339; 525/423
See application file for complete search history.

(56) References Cited

U.S. PATENT DOCUMENTS

| | | |
|---|---|---|
| 3,386,965 A | 6/1968 | Huffman |
| 3,560,137 A * | 2/1971 | Hahn et al. ............... 8/115.51 |
| 4,461,886 A | 7/1984 | Rogers et al. |
| 5,039,785 A | 8/1991 | Irwin |
| 5,087,691 A | 2/1992 | Harris |
| 5,160,619 A | 11/1992 | Yamaguchi et al. |
| 5,177,149 A | 1/1993 | Angeli et al. |
| 5,189,538 A | 2/1993 | Arakawa |
| 5,212,258 A * | 5/1993 | Irwin ...................... 525/432 |
| 5,240,770 A | 8/1993 | Moriga et al. |
| 5,290,887 A | 3/1994 | Hefner et al. |
| 5,387,657 A | 2/1995 | Hefner et al. |
| 5,396,355 A | 3/1995 | Wada et al. |
| 5,427,712 A | 6/1995 | Nakamura et al. |
| 5,529,818 A | 6/1996 | Tsuda et al. |
| 5,532,322 A | 7/1996 | Kadono et al. |
| 5,580,950 A | 12/1996 | Harris et al. |
| 5,677,390 A | 10/1997 | Dadgar et al. |
| 5,698,676 A | 12/1997 | Dhaon |
| 5,885,723 A | 3/1999 | Takahashi et al. |
| 5,985,942 A | 11/1999 | Steck et al. |
| 6,115,095 A | 9/2000 | Suzuki et al. |
| 6,175,400 B1 | 1/2001 | Duncan et al. |
| 6,479,581 B1 | 11/2002 | Ireland et al. |
| 6,881,454 B2 | 4/2005 | Taguchi |
| 7,037,443 B2 | 5/2006 | Shuto et al. |
| 7,135,211 B2 | 11/2006 | Shuto et al. |
| 7,227,602 B2 | 6/2007 | Jeon et al. |
| 7,236,221 B2 | 6/2007 | Ishikawa et al. |
| 2002/0041352 A1 | 4/2002 | Kuzuhara et al. |
| 2004/0051831 A1 | 3/2004 | Su Yu et al. |
| 2005/0057714 A1 | 3/2005 | Jeon et al. |
| 2005/0105027 A1 | 5/2005 | Wada et al. |
| 2005/0200792 A1 | 9/2005 | Jeon et al. |
| 2005/0270458 A1 | 12/2005 | Ishikawa et al. |
| 2006/0062935 A1 | 3/2006 | Murakami |
| 2006/0114383 A1 | 6/2006 | Kobayashi et al. |
| 2006/0180908 A1 | 8/2006 | Yano et al. |
| 2007/0020407 A1 | 1/2007 | Umemoto et al. |

(Continued)

FOREIGN PATENT DOCUMENTS

| | | |
|---|---|---|
| CN | 101223250 | 7/2008 |
| CN | 101223250 A | 7/2008 |

(Continued)

OTHER PUBLICATIONS

Technical Data Sheet, EPON Resin 1001F, Hexion (2007) pp. 2.*
Garcia et al. High-performance aromatic polyamides, Progress in polymer science, vol. 35, 2010, pp. 623-686.*
Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.
Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.

(Continued)

*Primary Examiner* — Aaron Austin
*Assistant Examiner* — Alicia Sawdon
(74) *Attorney, Agent, or Firm* — Benesch, Friedlander, Coplan & Aronoff LLP

(57) ABSTRACT

Films with optical transmittance of >80% between 400 and 750 nm and with coefficient of thermal expansion less than 20 ppm/° C. are prepared from aromatic polyamides that are soluble in polar organic solvents yet have glass transition temperatures >300° C. The films are crosslinked in the solid state by heating at elevated temperatures for short periods of time in the presence of multifunctional epoxides. Surprisingly, the optical and thermal properties of the films do not change significantly during the curing process. The temperature required for the crosslinking process to take place can be reduced by the presence of a few free, pendant carboxyl groups along the polyamide backbones. The films are useful as flexible substrates for electronic displays and photovoltaic devices.

19 Claims, No Drawings

(56) References Cited

U.S. PATENT DOCUMENTS

| | | | |
|---|---|---|---|
| 2007/0046870 A1 | 3/2007 | Murakami et al. | |
| 2007/0177087 A1 | 8/2007 | Kawahara et al. | |
| 2007/0293626 A1* | 12/2007 | Chakravarti et al. | 524/599 |
| 2008/0239491 A1 | 10/2008 | Zheng et al. | |
| 2008/0241565 A1 | 10/2008 | Germroth et al. | |
| 2009/0068380 A1 | 3/2009 | Zheng et al. | |
| 2009/0318660 A1* | 12/2009 | Bos et al. | 528/310 |

FOREIGN PATENT DOCUMENTS

| | | | |
|---|---|---|---|
| EP | 1 506 991 | | 2/2005 |
| JP | 01113435 | | 5/1989 |
| JP | 01113435 | A | 5/1989 |
| JP | 04 215 602 | | 8/1992 |
| JP | 2006111866 | | 4/2006 |
| JP | 2007 046 059 | | 2/2007 |
| JP | 2007-063417 | | 3/2007 |
| JP | 2007-231224 | | 9/2007 |
| JP | 2009-067834 | | 4/2009 |
| JP | 2009-079210 | | 4/2009 |
| JP | 2009079210 | A * | 4/2009 |
| JP | 2010100695 | | 5/2010 |
| TW | 200420412 | A | 5/2009 |
| WO | 2007071566 | A1 | 6/2007 |
| WO | 2008 121584 | | 10/2008 |

OTHER PUBLICATIONS

Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.

Li, et al., "Hierarchical Assembly of a Series of Rod-Coil Block Copolymers: Supramolecular LC Phase in Nanoenvironment" Macromolecules 2004, vol. 37, No. 8, pp. 2854-2860.

Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.

Ito, H.; Oka, W.; Goto, H.; Umeda, H.; Plastic Substrates for Flexible Displays, JP Journal of Applied Physics, vol. 45, No. 5B, 2006, pp. 4325-4329.

Li, F.; Harris, F.W.; Cheng, S.Z.D.; Polyimide Films As Negative Birefringent Compensators for Normally White Twisted Nematic Liquid Crystal Displays, Polymer vol. 37, No. 23, 1996, pp. 5321-5325.

Matthews, A. S.; Kim, I.; HA, C.S.; Fully Aliphatic Polyimides From Adamantane-Based Diamines for Enhanced Thermal Stability, Solubility, Transparency, and Low Dielectric Constant, Dept. of Polymer Science and Engineering, Pusan National University, Busan, 2006, pp. 609-735, Korea.

Mehdipour-Antaei, S.; Babanzadeh, S.; New Types of Heat-Resistant, Flame-Retardant Ferrocene-Based Ployamides With Improved Solubility, Iran Polymer and Petrochemical Institute, P. O. Box 14965/115, Tehran, Iran (Available at ScienceDirect, Reactive & Functional Polymers 67, 2007, pp. 883-892.

Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-Bis(4-Aminophenyl)-N,N'-Diphenyl-1,4-Phenylenediamine; Journal of Polymer Science; Part A: Polymer Chemistry, vol. 40, 2002, pp. 2810-2818.

Phillips, R.E.; Soulen, R.L.; Propylene Oxide Addition to Hydrochloric Acid, Journal of Chemical Education, vol. 72, No. 7, Jul. 1995, pp. 624-625.

Seo, K.B.; Jeong, J.K.; Choi, S.J.; Hong, Y.T.; Suh, D.H.; Synthesis and Characterization of Novel Aromatic-Aliphatic Poly(Amide-Imide-Imide)S (PAII), Die Angewandte Makromolekulare Chemic 264, 1999, oo, pp. 30-38, (Mr 4590).

Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.

Mehdipour-Ataei, S.; Hatami, M.; Mosslemin, M.H.; Organosoluble, Thermally Stable Polyamides Containing Sulfone and Sulfide Units, Chinese Journal of Polymer Science, vol. 27, No. 6, 2009, pp. 781-787.

Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.

Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.

European Search Report, PCT/US2012/044978, dated Oct. 17, 2014.

Notice of Examiner's Comment, dated pp. 3-9.

European Search Report, PCT/US2012/044978, dated Oct. 17, 2014; 5 pages.

Notice of Examiner's Comment; dated Oct. 22, 2014; 7 pages.

* cited by examiner

AROMATIC POLYAMIDE FILMS FOR SOLVENT RESISTANT FLEXIBLE SUBSTRATES

FIELD

This application claims priority to a provisional patent application, Ser. No. 61/504,607, filed Jul. 5, 2011, entitled Aromatic Polyamide Films For Solvent Resistant Flexible Substrates, the contents of which are herein incorporated by reference. The invention relates to the manufacture of thermally and dimensionally stable transparent polymer films. More particularly, the invention relates to the manufacture and use of aromatic polyamides, which have a rigid backbone with a glass transition temperature (Tg) higher than 300° C., yet are still soluble in conventional organic solvents without the need for the presence of inorganic salts. The polymer films, which are prepared by solution casting, have high optical transparency over a range of 400~750 nm (transmittance >80%) and a low coefficient of thermal expansion (CTE)<20 ppm/° C.). They can be made solvent resistant by heating at approximately 280° C. or lower for less than 30 minutes in the presence of a multifunctional epoxide. The curing temperature can be reduced to approximately 250° C. or lower by incorporating a few pendant carboxyl groups along the polyamide backbone. The cross-linking process takes place without a significant change in the film optical and thermal properties. The films are useful as flexible substrates for electronic and photovoltaic devices.

BACKGROUND

Organic Light Emitting Diode (OLED) displays were a $1.25 billion market in 2010, which is projected to grow annually at a rate of 25%. The high efficiency and high contrast ratio of OLED displays make them a suitable replacement for liquid crystal displays (LCDs) in the mobile phone display, digital camera, and global positioning system (GPS) market segments. These applications place a premium on high electrical efficiency, compact size, and robustness. This has increased the demand for active matrix OLEDs (AMOLEDs) which consume less power, have faster response times, and higher resolutions. AMOLED innovations that improve these properties will further accelerate AMOLED adoption into portable devices and expand the range of devices that use them. These performance factors are largely driven by the processing temperature of the electronics. AMOLEDs have a thin-film transistor (TFT) array structure which is deposited on the transparent substrate. Higher TFT deposition temperatures can dramatically improve the electrical efficiency of the display. Currently, glass plates are used as AMOLED substrates. They offer high processing temperatures (>500° C.) and good barrier properties, but are relatively thick, heavy, rigid, and are vulnerable to breaking, which reduces product design freedom and display robustness. Thus, there is a demand by portable device manufacturers for a lighter, thinner, and more robust replacement. Flexible substrate materials would also open new possibilities for product design, and enable lower cost roll-to-roll fabrication.

Many polymer thin films have excellent flexibility, transparency, are relatively inexpensive, and are lightweight. Polymer films are excellent candidates for substrates for flexible electronic devices, including flexible displays and flexible solar cell panels, which are currently under development. Compared to rigid substrates like glass, flexible substrates offer some potentially significant advantages in electronic devices, including:

(A) Light weight (glass substrates represent about 98% of the total weight in a thin film solar cell).

(B) Flexible (Easy to handle, low transportation costs, and/or more applications for both raw materials and products.)

(C) Amenable to roll-to-roll manufacturing, which could greatly reduce the manufacturing costs.

To facilitate these inherent advantages of a polymeric substrate for the flexible display application, several issues must be addressed including:

(A) Increasing the thermal stability;

(B) Reducing the coefficient of thermal expansion (CTE);

(C) Maintaining high transparency during high temperature processing;

(D) Increasing the solvent resistance; and (E) Increasing the oxygen and moisture barrier properties. Currently, no candidate substrate film can provide sufficient barrier properties. However, this is not a limiting factor as an additional barrier layer can be applied.

Several polymer films have been evaluated as transparent flexible substrates, including: polyethylene terephthalate (PET), polyethylene naphthalate (PEN), polycarbonate (PC), polyethersulfone (PES), cyclic olefin polymer (COP), polyarylates (PAR), polyimides (PI), and others. However, no one film can meet all the requirements. Currently, the industrial standard for this application is PEN film, which meets part of the requirements (Transmittance >80% between 400 nm and 750 nm, CTE <20 ppm/° C.), but has a limited use temperature (<200° C.). A transparent polymer film with a higher thermal stability (Tg>300° C.) and a lower CTE (<20 ppm/° C.) is desirable.

Conventional aromatic polyimides are well known for their excellent thermal and mechanical properties, but their films, which must be cast from their polyamic acid precursors, are usually dark yellow to orange. Some aromatic polyimides have been prepared that can be solution cast into films that are colorless in the visible region. However, these films have significant absorbance at 400 nm. The films also do not display the required low CTE and are not solvent resistant (For example, F. Li. F. W. Harris, and S. Z. D. Cheng, Polymer, Vol. 37, 23, (1996) pp 5321). Polyimide films based on part or all alicyclic monomers, such as those described in patents JP 2007-063417 and JP 2007-231224, and publication by A. S. Mathews et al (A. S. Mathews et al, J. Appl. Polym. Sci., Vol. 102, (2006) 3316-3326), show improved transparency. Although Tg of these polymers can be higher than 300° C., at these temperatures the polymers do not show sufficient thermal stability.

Fiber reinforced polymer composite films, such as reported by H. Ito (H. Ito, Jap. J. Appl. Phys., 45, No. 5B, (2006) pp 4325), combine the dimensional stability of fiber glass in a polymer film, offering an alternative way to achieve a low CTE. However, in order to maintain a high transparency, the refractive indices of the matrix polymer and the fiber must be precisely matched, which greatly limits the choice of the matrix polymer. Nanoparticles have also been incorporated in polymers in an attempt to lower their CTE. However, the effect was not significant (J M Liu, et al, J. SID, Vol. 19, (2011) No. 1).

The properties of aromatic polyamides suggest they might be useful in the preparation of flexible substrates. However, the majority are insoluble in organic solvents and, thus, cannot be solution cast into films. A few are soluble in polar aprotic solvents containing inorganic salts. Some of these have been investigated for use as flexible substrates. For example, JP 2009-79210A describes a thin film prepared from a fluorine containing aromatic polyamide that displays a very low CTE (<10 ppm/° C.), good transparency (T %>80 between 450~700 nm), and excellent mechanical properties. However, the presence of the inorganic salt makes film fabrication difficult. The maximum thickness of the films is also only 20 µm, because a dry-wet method must be used to remove the salt during the film preparation.

SUMMARY

The present invention is directed toward films with optical transmittance of >80% between 400 and 750 nm and with CTEs less than 20 ppm/° C. The films are prepared from aromatic polyamides that are soluble in organic solvents yet have Tg>300° C. Significantly, inorganic salts do not have to be added to keep the polymer in solution. The films are cast using solutions of the polyamides in polar aprotic solvents such as N,N-dimethylacetamide (DMAc). It has been discovered that the films can be crosslinked in the solid state by heating at elevated temperatures for short periods of time in the presence of multifunctional epoxides. Although epoxy resins are known to react with aliphatic polyamides in the melt, their reactions with aromatic polyamides have not been studied or utilized previously due to the insolubility and infusibility of these polymers. Surprisingly, the optical and thermal properties of the films do not change significantly during the curing process. It has also been discovered that the temperature required for the crosslinking process to take place can be reduced by the presence of a few free, pendant carboxyl groups along the polyamide backbones. Importantly, such a structural modification does not result in the development of color during the curing process.

The polyamides in the present invention are obtained from the polymerization of aromatic diamines with aromatic diacid chlorides in polar organic solvents at approximately −10° C. to about 30° C. The hydrochloric acid by-product that is also generated is neutralized or removed from the polymerization mixture as the reaction proceeds. When the hydrochloric acid is removed by reaction with a volatile trapping agent, the resulting colorless and homogenous polymer solution can be used directly for subsequent film casting. In this process the hydrogen chloride adduct is volatilized along with the residual solvent in the casting procedure. Alternatively, the polyamide can be first isolated and used to prepare a solution that is cast into film. In either case a small amount of a multifunctional epoxide is added to the solution prior to the casting procedure.

The solutions of the polyamides containing the multifunctional epoxide can be continuously cast using a roll-to-roll process into transparent, free standing films with thicknesses greater than approximately 10 µm. After the films are heated between approximately 220° C. to approximately 280° C. for less than 30 minutes they display: (1) high Tg (>300° C.); (2) low CTEs (<20 ppm/° C.); (3) high transparencies (T>80% between 400 to 750 nm); (4) excellent mechanical properties (tensile strengths >200 MPa); (5) low moisture absorptions (<2% @ 100% humidity at room temperature); and (6) excellent solvent resistance. The films can also be made in a similar manner using a batch process.

The polyamide solutions can also be solution cast on supporting substrates such as thin glass, silica, and microelectronic devices. Curing is carried out by the process described above, but in this case the polymer is not isolated as a free standing film. The supported film thickness is greater than 4 µm.

Furthermore, the copolymer solutions can also be solution cast on a carrier film such as polyester to form a thin film. The copolyamide film is then stripped from the carrier film and laminated to a supporting substrate such as thin glass, silica, and microelectronic devices.

According to one embodiment of this invention a process of preparing a solvent-resistant, transparent film with a CTE less than 20 ppm/° C. from a soluble aromatic polyamide having a glass transition temperature greater than 300° C. is provided comprising the steps of:

(A) Reacting one or more aromatic diamines with one or more aromatic diacid dichlorides in a polar solvent to afford a polyamide and hydrochloric acid;

(B) Removing the free hydrochloric acid by reaction with a reagent such as an alkylene oxide, a tertiary amine and an inorganic base;

(C) Removing the hydrogen chloride adduct by evaporation or by precipitation of the polymer in a non-solvent;

(D) Adding a multifunctional epoxide to the original polyamide solution or a solution prepared from the precipitated polymer;

(E) Casting the resulting mixture into a film at a temperature less than approximately 200° C.; and (F) Heating the film at a temperature of approximately 280° C. or lower for less than 30 minutes under nitrogen or under reduced pressure.

After the heating process, the film does not dissolve, swell or wrinkle when exposed to most of the commonly used organic solvents, including DMAc, N-methylpyrrolidone (NMP), dimethyl sulfoxide (DMSO), etc.

According to another embodiment of this invention, a transparent, solvent resistant film is produced comprising an aromatic polyamide having repeat units with a general formula (I):

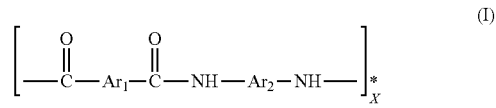

wherein X represents the mol % of repeating structure (I) and $Ar_1$ is selected from the group of aromatic units with the general structures:

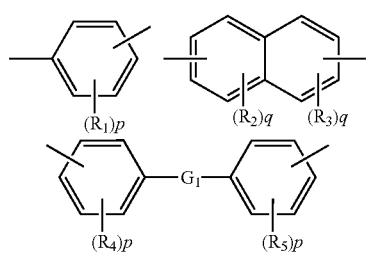

wherein p is 4, q is 3, and wherein $R_1$, $R_2$, $R_3$, $R_4$, $R_5$ are selected from the group comprising hydrogen, halogen (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_1$, $R_2$, $R_3$, $R_4$, and $R_5$ can be the same or different. $G_1$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group; a perfluorobiphenyl group, a 9,9'-bisphenylenefluorene group, and a substituted 9,9'-bisphenylenefluorene group.

wherein $Ar_2$ is selected from the group of aromatic units with the general structures:

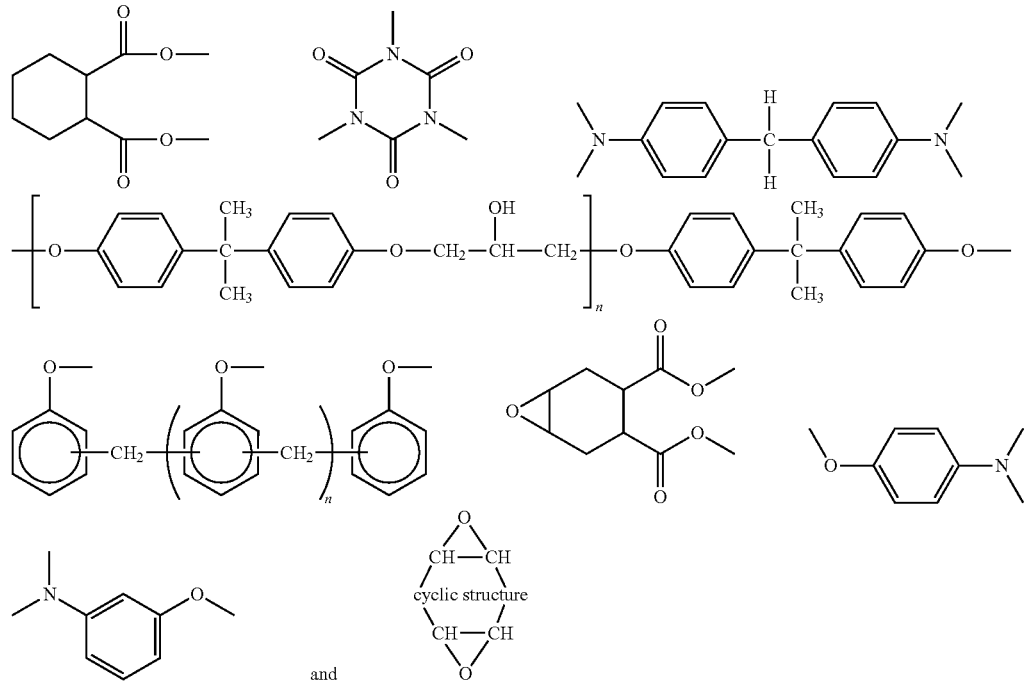

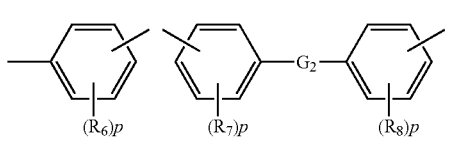

wherein p is 4, wherein $R_6$, $R_7$, and $R_8$ are selected from the group comprising hydrogen, halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_6$, $R_7$, and $R_8$ can be the same or different. $G_2$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a Si $(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group.

And, one or more multifunctional epoxides containing two or more epoxy groups selected from the group with the general structures (II), (III) and (IV):

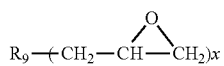

(II)

wherein x>1 and $R_9$ is selected from the group (III)

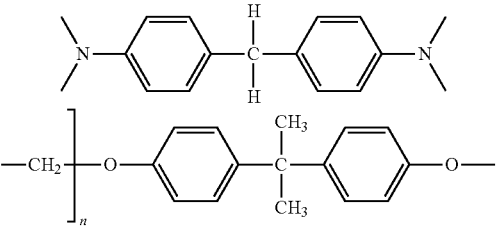

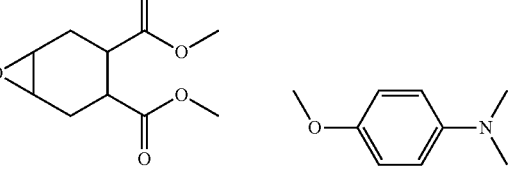

wherein the cyclic structure is selected from the group (IV)

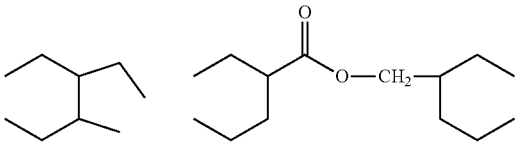

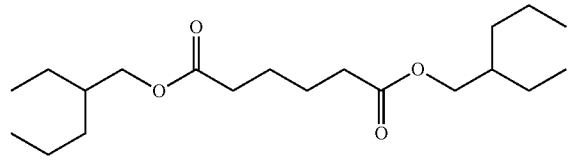

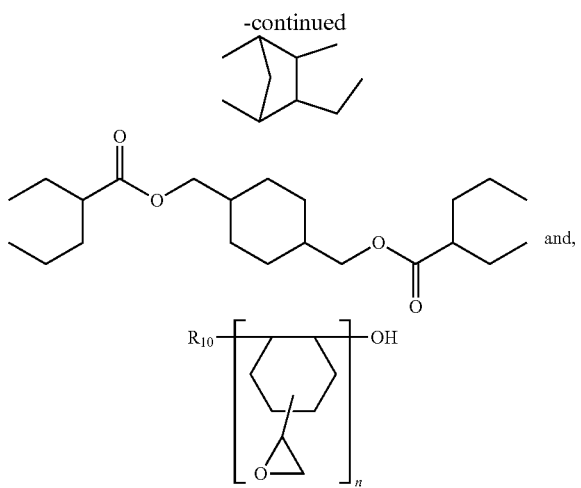

wherein n and $n_1$>1 and $R_{10}$ is an alkyl or aryl group.

The polyamides are prepared by polymerizing one or more aromatic diacid dichlorides with the following general structures:

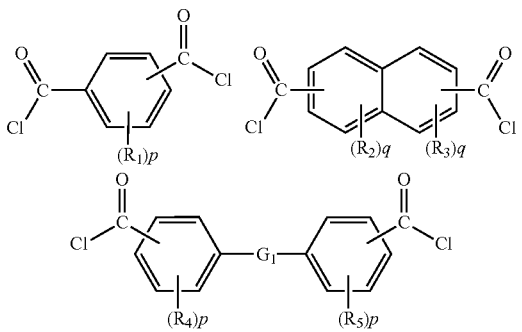

wherein p is 4, q is 3; $R_1$, $R_2$, $R_3$, $R_4$ and $R_5$ are selected from the group consisting of hydrogen, halogens, viz. fluoride, chloride, bromide and iodide, alkyl; substituted alkyl groups such as halogenated alkyls; cyano groups; thioalkyl groups; alkoxy groups; aryl, or substituted aryl groups such as halogenated aryls; alkyl ester groups; and substituted alkyl ester groups and combinations thereof; It is to be understood that $R_1$, $R_2$, $R_3$, $R_4$, and $R_5$ can be the same or different. $G_1$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; 9,9'-bisphenylenefluorene group; substituted 9,9'-bisphenylenefluorene group; and an OZO group, wherein Z is a aryl group or substituted aryl group, such as a phenyl group, a biphenyl group, a perfluorobiphenyl group, a 9,9'-bisphenylenefluorene group, and substituted 9,9'-bisphenylenefluorene group, with one or more aromatic diamines with the following general structures:

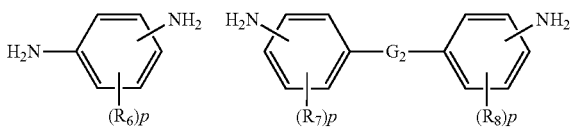

wherein p is 4, wherein $R_6$, $R_7$ and $R_8$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that $R_6$, $R_7$, and $R_8$ can be the same or different; and wherein $G_2$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; 9,9'-bisphenylenefluorene group; substituted 9,9'-bisphenylenefluorene group; and an OZO group, wherein Z is an aryl group or substituted aryl group, such as a phenyl group, a biphenyl group, a perfluorobiphenyl group, a 9,9'-bisphenylenefluorene group, and a substituted 9,9'-bisphenylenefluorene group, in polar organic solvents at approximately −10° C. to about 30° C.

According to yet another embodiment of this invention a method of preparing a solvent-resistant, transparent film with a CTE less than 20 ppm/° C. from a copolyamide having a glass transition temperature greater than 300° C. is provided comprising the steps of:

(A) Reacting a mixture of two or more aromatic diamines, where at least one of the diamines contains a free carboxyl group, with one or more diacid dichlorides in a polar solvent to afford a copolyamide and hydrochloric acid;

(B) Removing the free hydrochloric acid by reaction with a reagent such as an alkylene oxide, a tertiary amine and an inorganic base;

(C) Removing the hydrogen chloride adduct by evaporation or by precipitation of the polymer in a non-solvent;

(D) Adding a multifunctional epoxide to the original polyamide solution or a solution prepared from the precipitated polymer;

(E) Casting the resulting mixture into a film at a temperature less than approximately 200° C.;

(F) Heating the film at a temperature of approximately 250° C. or lower for less than 30 minutes under nitrogen or under reduced pressure.

After the heating process, the film does not dissolve, swell or wrinkle when exposed to most of the commonly used organic solvents, including NMP, DMAc, dimethyl sulfoxide (DMSO), etc.

According to another embodiment of this invention, a transparent, solvent resistant film is produced comprising an aromatic copolyamide having repeat units with a general formula (I) and (V):

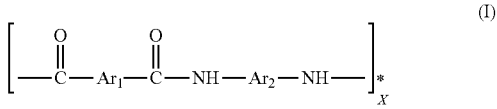

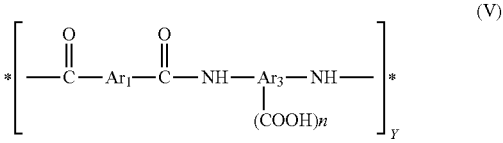

wherein X represents the mole % of the repeat structure (I), which can vary from 90 to 99 mole %, and (V) represents the mole % of the repeat structure Y, which can vary from 10 to 1 mole % and n can be 1 to 4.

wherein $Ar_1$ is selected from the group of aromatic units with the general structures:

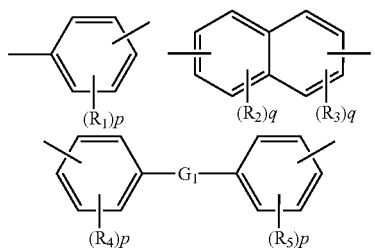

wherein p is 4, q is 3, and wherein $R_1$, $R_2$, $R_3$, $R_4$, $R_5$ are selected from the group comprising halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_1$, $R_2$, $R_3$, $R_4$, and $R_5$ can be the same or different. $G_1$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group, wherein $Ar_2$ is selected from the group of aromatic units with the general structures:

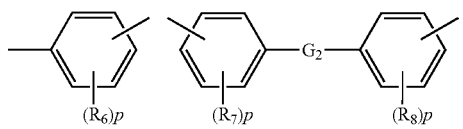

wherein p is 4, wherein $R_6$, $R_7$, $R_8$ are selected from the group comprising halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_1$, $R_2$, $R_3$, $R_4$, and $R_5$ can be the same or different. $G_2$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group.

wherein $Ar_3$ is selected from the group of aromatic units with the general structures:

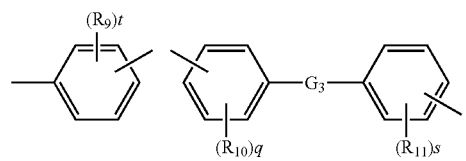

wherein t is 0 to 3, g is 0 to 4, and s is 0 to 4, wherein $R_9$, $R_{10}$, $R_{11}$ are selected from the group comprising hydrogen, halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_9$, $R_{10}$, and $R_{11}$ can be the same or different. $G_3$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group.

It should be understood that the copolyamide may contain multiple repeat units with structures (I) and (II) where $Ar_1$, $Ar_2$, and $Ar_3$ may be the same or different.

and one or more multifunctional epoxides containing two or more epoxy groups selected from the group with the general structures (II), (III) and (IV):

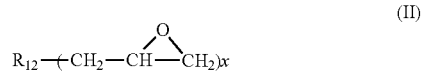

(II)

wherein x>1 and $R_{12}$ is selected from the group

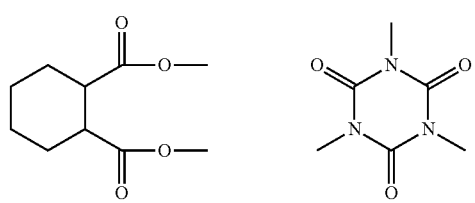

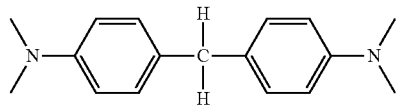

(III)

-continued

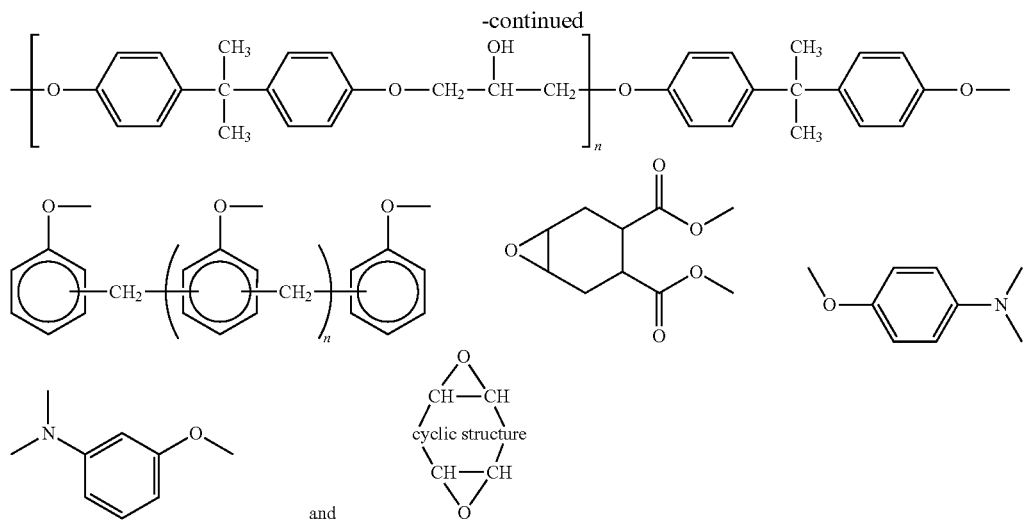

wherein the cyclic structure is selected from the group

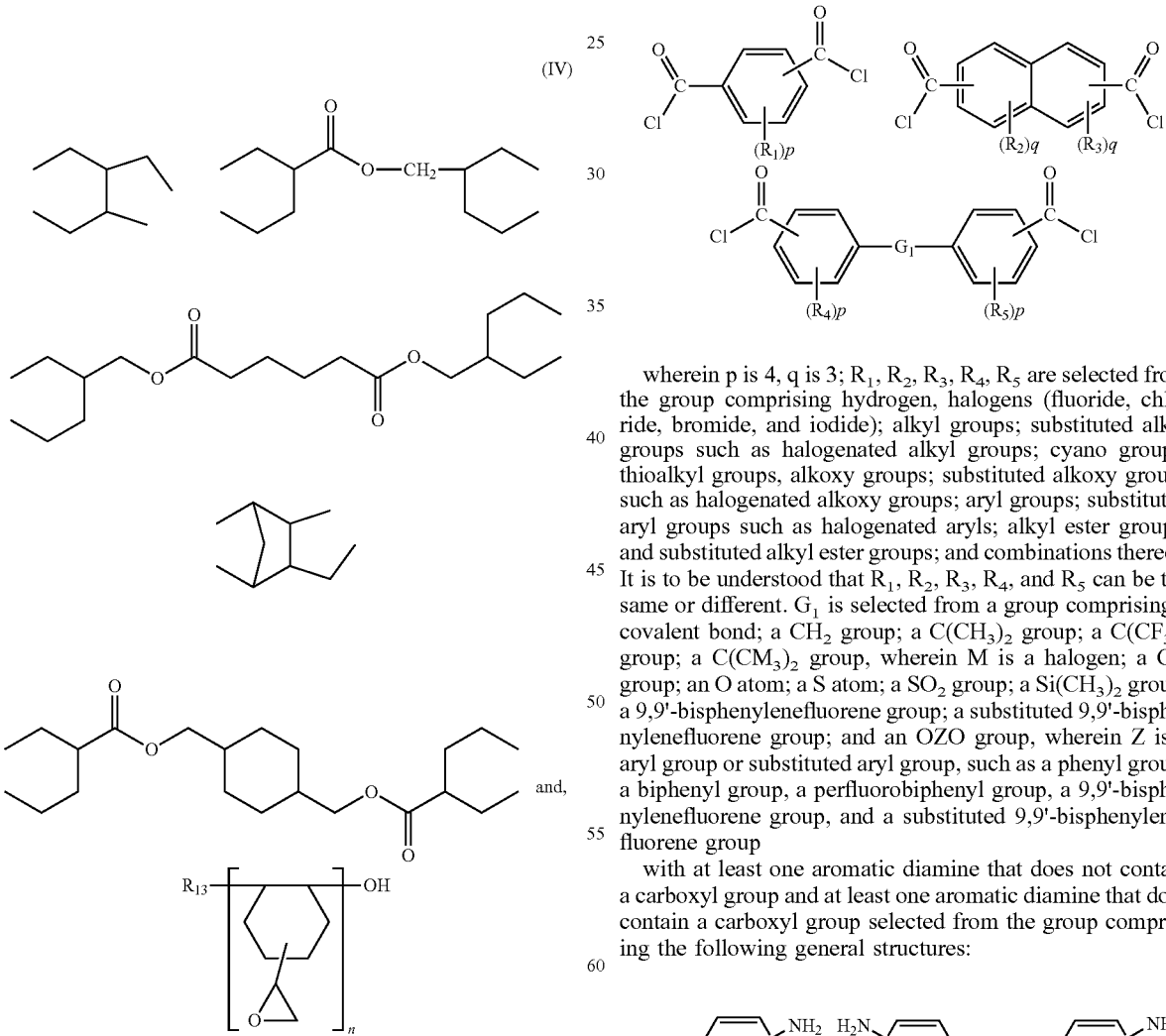

The copolyamides are prepared by polymerizing one or more aromatic diacid dichlorides with the following general structures:

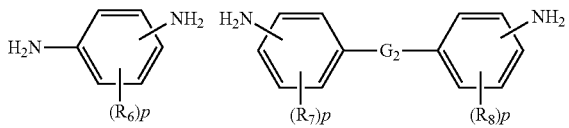

wherein p is 4, q is 3; $R_1$, $R_2$, $R_3$, $R_4$, $R_5$ are selected from the group comprising hydrogen, halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_1$, $R_2$, $R_3$, $R_4$, and $R_5$ can be the same or different. $G_1$ is selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group with at least one aromatic diamine that does not contain a carboxyl group and at least one aromatic diamine that does contain a carboxyl group selected from the group comprising the following general structures:

-continued

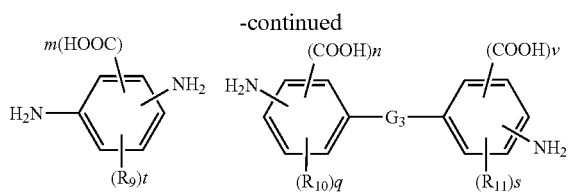

wherein p is 4, m is 1 to 4, n is 0 to 4, v is 0 to 4, t is 0 to 3, q is 0 to 4, and s is 0 to 4, wherein $R_6$, $R_7$, $R_8$, $R_9$, $R_{10}$, $R_{11}$ are selected from the group comprising hydrogen, halogens (fluoride, chloride, bromide, and iodide); alkyl groups; substituted alkyl groups such as halogenated alkyl groups; cyano groups; thioalkyl groups, alkoxy groups; substituted alkoxy groups such as halogenated alkoxy groups; aryl groups; substituted aryl groups such as halogenated aryls; alkyl ester groups; and substituted alkyl ester groups; and combinations thereof. It is to be understood that $R_1$, $R_2$, $R_3$, $R_4$, and $R_5$ can be the same or different. $G_2$ and $G_3$ are selected from a group comprising a covalent bond; a $CH_2$ group; a $C(CH_3)_2$ group; a $C(CF_3)_2$ group; a $C(CM_3)_2$ group, wherein M is a halogen; a CO group; an O atom; a S atom; a $SO_2$ group; a $Si(CH_3)_2$ group; a 9,9'-bisphenylenefluorene group; a substituted 9,9'-bisphenylenefluorene group; and an OZO group, wherein Z is a aryl group or substituted aryl group, such as a phenyl group; a biphenyl group, a perfluorobiphenyl group, a 9,9'-bisphenylenefluorene group, and a substituted 9,9'-bisphenylenefluorene group, in polar solvents at −10° C. to about 30° C.

DETAILED DESCRIPTION

The present invention is directed toward transparent, solvent resistant films prepared from aromatic polyamides. The polyamides are prepared via a condensation polymerization of aromatic diamines and diacid chlorides in a polar solvent, where the hydrochloric acid generated in the reaction is trapped by a reagent like an alkylene oxide, a tertiary amine, or an inorganic base. Akylene oxides such as propylene oxide are preferred because their hydrogen chloride adducts can be easily removed by volatilization. The diamines and diacid chlorides must be selected so that the copolyamide remains in solution during the polymerization without the need for added inorganic salts. Rigid, linear diacid dichlorides such as terephthaloyl dichloride reduce solubility, but they increase the polymer Tg and their use results in a lower film CTE. Non-linear, diacid dichlorides such as isophthaloyl dichloride slightly increase solubility, but they decrease the polymer Tg and slightly increase the film CTE. Mixtures of these two monomers can be used to obtain the best combination of effects (Table 1). The most dramatic effects on polymer solubility can be achieved through the proper selection of the diamine components. Rigid monomers such as p-phenylenediamine reduce the polymer CTE and increase the Tg, but they dramatically decrease solubility. Thus, they can only be used in very small amounts (<10 mol %). Flexible monomers containing ether linkages increase the polymer solubility, but they also increase the CTE. Thus, they cannot be used alone. However, a combination of the two types of monomers can be used to achieve the targeted properties. Diamines containing cardo units such as 9,9'-bis(4-aminophenyl)fluorene (FDA) are unique in that they increase the polymer solubility and the Tg. Although their effect on CTE is minimal when used in small amounts, the use of more than 30 mol % results in an increase in CTE (Table 2). Diamines containing carboxyl groups such as 3,5-diaminobenzoic acid (DAB) and 4,4'-diaminodiphenic acid (DADP) increase the polymer solubility, but only a limited amount (<10 mol %) can be used due to undesirable side effects. DADP is preferred because it increases solubility and reduces CTE. Particularly useful diamine monomers are those that contain twisted biphenyl structures such as 2,2'-bis(trifluoromethyl)-4,4'-diaminobiphenyl (PFMB) (Tables 1 and 2). Such monomers increase solubility while reducing film CTE and can be used alone. It is important that all the diamines be handled carefully as they can undergo oxidation with the development of color. Their polymerizations also have to be carried out under a blanket of inert gas in order to prevent their oxidation. Diamines that readily undergo oxidation such as p-phenylenediamine and m-phenylenediamine require special care, and must be used in very small amounts (>10 mol %). Diamines containing electron-withdrawing groups such as trifluoromethyl groups are much preferred as they are much more resistant to oxidation.

The films, which display transparences >80% from 400 to 750 nm, can be prepared by casting procedures at temperatures below approximately 200° C. directly from the polymerization solutions if a volatile reagent such as propylene oxide is used to trap the hydrochloric acid by product. The adduct of the hydrochloride acid and the reagent is removed by evaporation along with the solvent during the film casting process. Alternatively, the polyamide may be first isolated by precipitation in a non-solvent. The film casting solution is then prepared by dissolving the polymer in a polar solvent. In either case, a multifunctional epoxide is added to the solution prior to casting. The epoxide must display minimum color. Colorless epoxides are much preferred. The minimum amount of epoxide is used that results is a film that displays solvent resistance after being heated at approximately 250° C. to approximately 280° C. for less than 30 minutes. The use of an excessive amount of epoxide results in a film that yellows when heated to elevated temperatures. The preferred amount on epoxide is 2 to 10 wt % of the weight of the polyamide. The most preferred amount is 4 to 6 wt %. The greater the number of epoxy groups in the multifunctional epoxide the smaller the amount that has to be used. The temperature required for the crosslinking process to take place can be lowered to approximately 250° C. or less by incorporating pendant carboxylic acid groups along the polymer backbone. This can be achieved through the use of a diamines containing carboxyl groups such as 3,5-diaminobenzoic acid and 4,4'-diaminodiphenic acid. However, only a limited amount of these monomers can be used. An excessive amount of carboxyl groups results in a polymer that: 1) cannot be made solvent resistant even through the use of excess amounts of a multifunctional epoxides; 2) is moisture sensitive; and 3) displays too high a CTE and a reduced thermal stability. The preferred amount of the functionalized diamine is 1 to 10 mol % of the diamine mixture. The most preferred amount is 3 to 6 mol %. The greater the number of carboxyl groups in the diamine, the less the amount that is required to enhance the crosslinking process.

The carboxyl group is unique in that it facilitates crosslinking with the epoxide without the development of color. It has been discovered that other functional groups that react with epoxy groups such as hydroxyl groups promote crosslinking, but at the expense of color development. Although not to be bound by theory, it is postulated that the carboxylic acid groups also catalyze the reaction of the epoxy groups with the amide linkages. Polyamides containing carboxyl groups will also undergo crosslinking without the presence of a multifunctional epoxide. However, in this case, the polymer must be heated to over 300° C. (Table 3).

The curing process is carried out under reduced pressure or in an inert atmosphere so that no change in the film properties occurs. It is especially important that the process is carried out without any oxidative degradation that leads to the development of color. The films display CTEs <20 ppm/° C. as cast and do not need to be subjected to stretching.

Representative and illustrative examples of the useful aromatic diacid dichlorides in the invention are:

Terephthaloyl Dichloride (TPC)

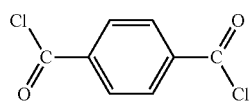

Isophthaloyl Dichloride (IPC)

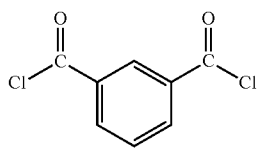 [SMILES: O=C(Cl)c1cccc(C(=O)Cl)c1]

2, 6-Naphthaloyl Dichloride (NDC)

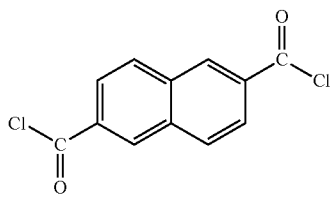 [SMILES: O=C(Cl)c1ccc2cc(C(=O)Cl)ccc2c1]

4, 4-Biphenyldicarbonyl Dichloride (BPDC)

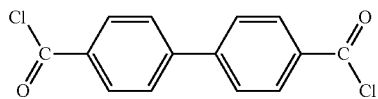 [SMILES: O=C(Cl)c1ccc(-c2ccc(C(=O)Cl)cc2)cc1]

Representative and illustrative examples of the useful aromatic diamines in the invention are:

m-Phenylenediamine

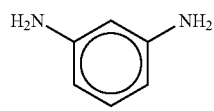

p-Phenylenediamine

2, 2'-Bis(trifluoromethyl)-4,4'-diaminobiphenyl (PFMB)

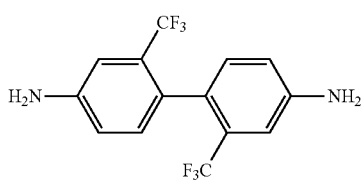 [SMILES: Nc1ccc(-c2ccc(N)cc2C(F)(F)F)c(C(F)(F)F)c1]

2,2'-Bis(trifluoromethoxyl)-4,4'-diaminobiphenyl (PFMOB)

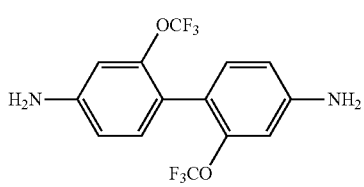 [SMILES: Nc1ccc(-c2ccc(N)cc2OC(F)(F)F)c(OC(F)(F)F)c1]

2,2'-Bis(trifluoromethyl)-4,4'-diaminodiphenyl ether (6FODA)

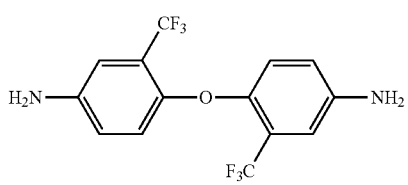 [SMILES: Nc1ccc(Oc2ccc(N)cc2C(F)(F)F)c(C(F)(F)F)c1]

Bis(2-trifluoromethyl-4-aminophenyloxyl)benzene (6FOQDA)

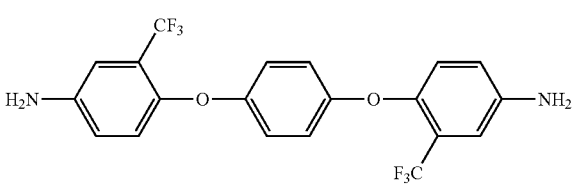 [SMILES: Nc1ccc(Oc2ccc(Oc3ccc(N)cc3C(F)(F)F)cc2)c(C(F)(F)F)c1]

Bis(2-trifluoromethyl-4-aminophenyloxyl)biphenyl
(6FOBDA)

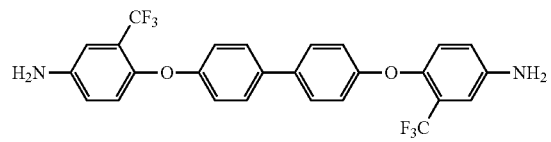

9,9'-Bis(4-aminophenyl)fluorine (FDA)

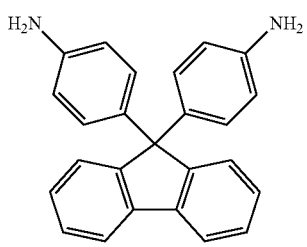 [SMILES: Nc1ccc(C2(c3ccc(N)cc3)c3ccccc3-c3ccccc32)cc1]

9,9'-Bis(3-fluoro-4-aminophenyl)fluorine (FFDA)

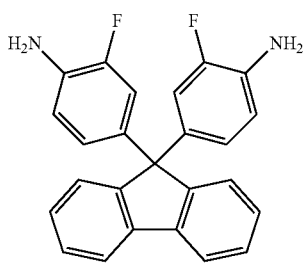 [SMILES: Nc1ccc(C2(c3ccc(N)c(F)c3)c3ccccc3-c3ccccc32)cc1F]

Representative and illustrative examples of the useful aromatic diamines with pendant free carboxylic acid groups in the invention are:

4,4'-Diaminodiphenic acid (DADP)

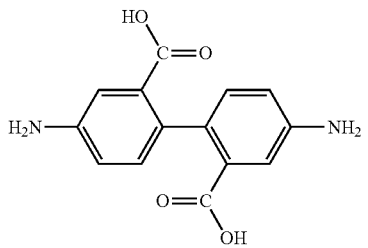 [SMILES: Nc1ccc(-c2ccc(N)cc2C(=O)O)c(C(=O)O)c1]

3,5-diaminobenzoic acid (DAB)

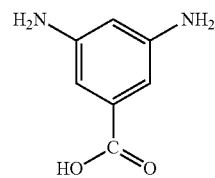 [SMILES: Nc1cc(N)cc(C(=O)O)c1]

The diamines may also be used in the form of their hydrochloride salts.

Representative and illustrative examples of multifunctional compounds containing epoxy groups useful in the invention are:

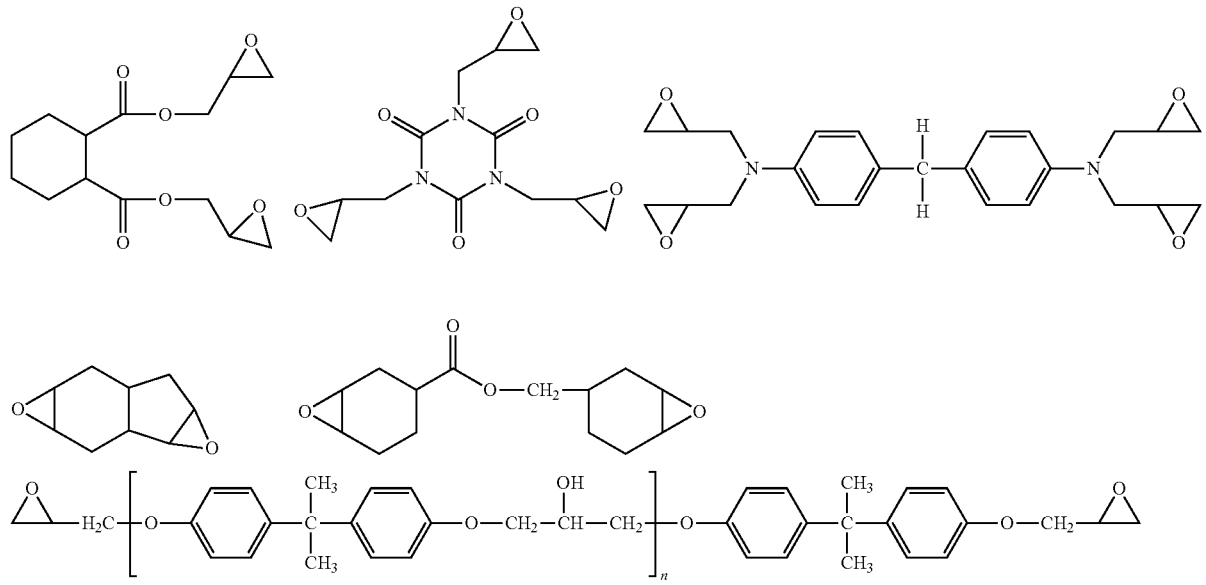

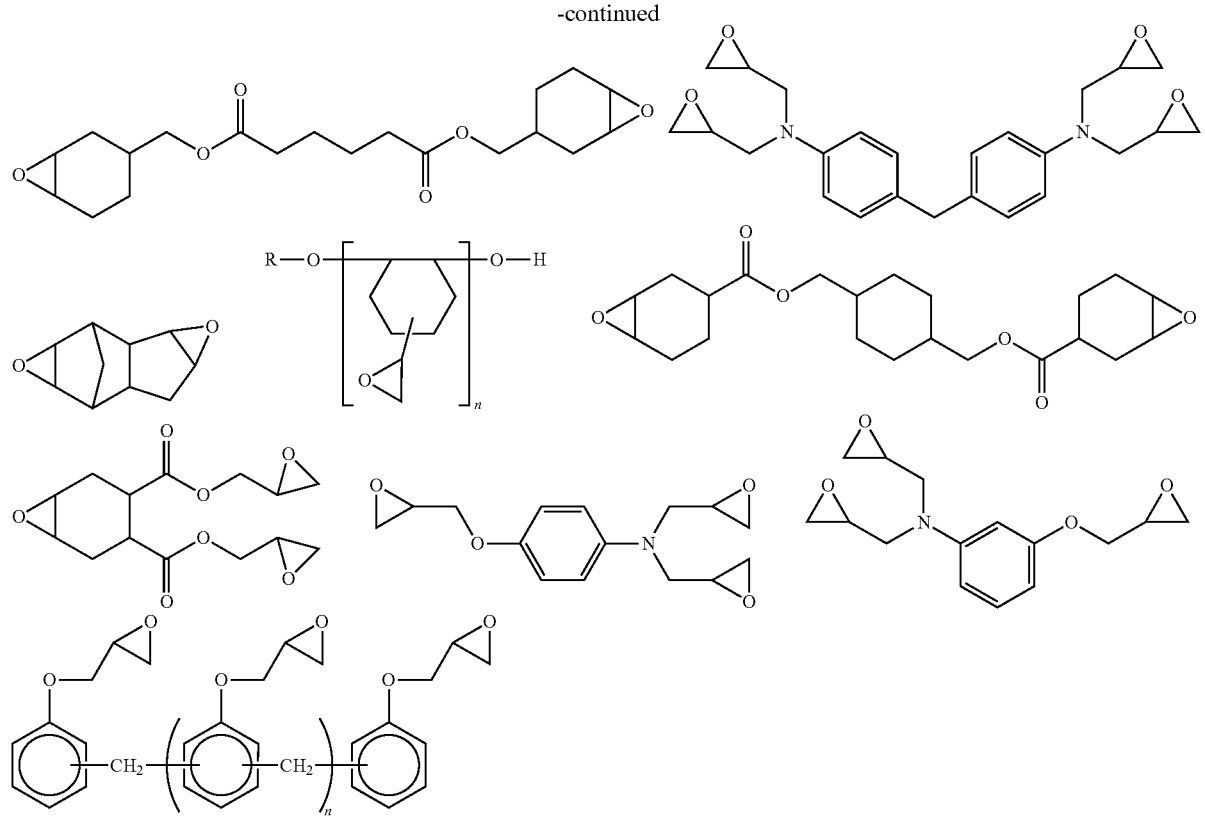

Using the principles described herein one skilled in the art can design multiple polyamide structures that display the targeted properties. For example, the following are exemplary polymers that can be used in this invention: 1) about 50 to about 70 mol % TPC, about 30 to about 50 mol % IPC, about 90 to about 99 mol % PFMB, and about 1 to about 10 mol % 4, 4'-diaminodiphenic acid (DADP); 2) about 50 to about 70 mol % TPC, about 25 to about 50 mol % IPC, about 90 to about 96 mol % PFMB, and about 4 to about 10 mol % 3, 5-diaminobenzoic acid (DAB); 3) about 100 mol % TPC, about 25 to about 85 mol % PFMB, about 15 to about 50 mol % 9, 9-bis(4-aminophenyl)fluorine (FDA), and about 1 to about 10 mol % DADP; and 4) about 100 mol % TPC, about 50 to about 85 mol % PFMB, about 15 to about 50 mol % FDA, and about 4 to about 10 mol % DAB

TABLE 1

CTEs of Films Prepared From Soluble TPC/IPC/PFMB Copolymers

| TPC/IPC/PFMB | CTE (ppm/° C.) | Copolymer $T_g$ (° C.) |
|---|---|---|
| 70/30/100 (Example 1) | 7.4 | 336 |
| 60/40/100 | 8.0 | 323 |
| 50/50/100 | 12.2 | 330 |
| 40/60/100 | 22.4 | 336 |
| 30/70/100 | 32.6 | 319 |
| 20/80/100 | 27.9 | 326 |
| 10/90/100 | 30.1 | 325 |
| 0/100/100 | 34.2 | 327 |

TABLE 2

CTEs of Films Prepared From Soluble TPC/FDA/PFMB Copolymers

| TPC/FDA/PFMB | CTE (ppm/° C.) | Copolymer $T_g$ (° C.) |
|---|---|---|
| 100/20/80 (Example 2) | 5.8 | 365 |
| 100/30/70 | 5.1 | 370 |
| 100/50/50 | 13.1 | 391 |
| 100/70/30 | 18.3 | 406 |
| 100/80/20 | 26.7 | 404 |
| 100/90/10 | 33.2 | 410 |
| 100/100/0 | >40 | >410 |

EXAMPLES

Example 1

This example illustrates the general procedure for the preparation of a soluble copolymer from TPC, FDA and PFMB. For purposes of illustration, a representative film having mol ratios of 100%/20%/80% of TPC, FDA, and PFMB, respectively, is described below, but it should be understood that films having varying mol ratios could be formed using the general procedure.

To a 100 ml, four necked, round bottom flask, equipped with a mechanical stirrer, a nitrogen inlet and outlet, are added PFMB (1.0247 g, 3.2 mmol), FDA (0.02788 g, 0.8 mmol), and dried DMAc (20 ml) at room temperature under nitrogen. After the PFMB dissolves completely, TPC (0.8201 g, 4.04 mmol) is added and the flask wall is washed with DMAc (5.0 ml) to remove any adhering TPC. The viscosity of the solution slowly increases until the mixture gels. After propylene oxide (0.5 g, 8.5 mmol) is added, the gel is broken up under stirring to form a viscous, homogenous solution. After the solution is stirred for another four hours, it is added to methanol to precipitate the copolymer, which is collected by filtration and dried under reduced pressure. The polymer is soluble in polar aprotic solvents.

Example 2

This example illustrates the general procedure for the preparation of a soluble copolymer from TPC, IPC and PFMB. For purposes of illustration, a representative film having mol ratios of 70%/30%/100% of TPC, IPC, and PFMB, respectively, is described below, but it should be understood that films having varying mol ratios could be formed using the general procedure.

To a 250 ml, three necked, round bottom flask, equipped with a mechanical stirrer, a nitrogen inlet and an outlet, is added PFMB (3.2024 g, 0.01 mol) and dried DMAc (45 ml) at room temperature under nitrogen. After the PFMB dissolves completely, IPC (0.6395 g, 0.003 mol) is added to the solution at room temperature under nitrogen, and the flask wall is washed with DMAc (1.5 ml). After 15 minutes, TPC (1.4211 g, 0.007) is added to the solution, and the flask wall is again washed with DMAc (1.5 ml). The viscosity of the solution increases until the mixture gels. After propylene oxide (1.4 g, 0.024 mol) is added, the gel is broken up with vigorous stirring to form a viscous, homogenous solution. The solution is added to methanol to precipitate the copolymer, which is collected by filtration and dried under reduced pressure. The polymer is soluble in polar aprotic solvents Comparative Example 1

This example illustrates the deleterious effect on solubility of using excessive p-phenylenediamine in the preparation of the polyamides of this invention.

To a 250 ml, three necked, round bottom flask equipped with a mechanical stirrer, a nitrogen inlet and outlet is added p-phenylenediamine (1.9465 g, 0.018 mol) and 3,5-diaminobenzoic acid (0.3043 g, 0.002 mol), dried N, N-dimethyl acetamide (60 ml) and propylene oxide (3.4 g). After the mixture is cooled under nitrogen to 10° C. with an ice/water bath, terephthaloyl chloride (4.0604 g, 0.02 mol) is added. A yellow polymer immediately precipitates from the solution. The polymer is insoluble in organic solvents.

Example 3

This example illustrates the general procedure for the preparation of a solution containing a copolymer prepared of TPC, IPC and PFMB (70%/30%/100% mol ratio) containing 5 wt % triglycidyl isocyanate (TGI) (based on the weight of the polymer).

To a 250 ml, three necked, round bottom flask, equipped with a mechanical stirrer, a nitrogen inlet and outlet, is added PFMB (3.2024 g, 0.01 mol), propylene oxide (1.4 g, 0.024 mol) and dried DMAc (45 ml). The solution is cooled to 10° C. in an ice/water bath. After the PFMB dissolves completely, IPC (0.6395 g, 0.003 mol) is added, and the flask wall is washed with DMAc (1.5 ml) to remove any adhering TPC. After 15 minutes, TPC (1.4211 g, 0.007 mol) is added, and the flask wall is again washed with DMAc (1.5 ml). The resulting viscous, homogenous solution is stirred at room temperature for another 4 hours. After TGI (0.45 g) is added, the mixture is stirred for another two hours. The resulting solution can be cast directly into film. In an alternative procedure, the polymer solution is added to methanol to precipitate the polymer. The polymer is isolated by filtration, washed with methanol, and dried at 100° C. under reduced pressure. The dried polymer is then dissolved in DMAc to give a solution containing approximately 10 wt % solids. The solids concentration can be adjusted to obtain an optimum solution viscosity for the film casting process used. After TGI is added, the solution is cast into film.

Example 4

This example illustrates the general procedure for the preparation of a solution containing a copolymer of TPC, IPC, DADP, and PFMB (70%/30%/3%/97% mol ratio) containing 5 wt % TGI (based on the weight of the polymer).

To a 250 ml, three necked, round bottom flask, equipped with a mechanical stirrer, a nitrogen inlet and outlet, are added PFMB (3.1060 g, 0.0097 mol), DADP (0.0817 g, 0.0003 mol), and dried DMAc (45 ml) at room temperature under nitrogen. After the PFMB dissolves completely, IPC (0.6091 g, 0.003 mol) is added, and the flask wall is washed with DMAc (1.5 ml) to remove any adhering IPC. After 15 minutes, TPC (1.4211 g, 0.007 mol) is added and the flask wall is again washed with DMAc (1.5 ml). The solution slowly gels. After propylene oxide (1.4 g, 0.024 mol) is added, the mixture is vigorously stirred to break up the gel and yield a viscous, homogenous solution. The mixture is stirred for another 4 hours at room temperature. After TGI (0.45 g) is added, the mixture is stirred for another two hours. The resulting solution can be directly cast into film.

Example 5

This example illustrates the general procedure for the preparation of a solution containing a copolymer of TPC, IPC, DAB, and PFMB (75%/25%/5%/95% mol ratio) containing 5 wt % TGI (based on the weight of the polymer).

To a 250 ml, three necked, round bottom flask, equipped with a mechanical stirrer, a nitrogen inlet and outlet, are added PFMB (3.0423 g, 0.0095 mol), DAB (0.0761 g, 0.0005 mol), and dried DMAc (45 ml) at room temperature under nitrogen. After the PFMB dissolves completely, IPC (0.5076 g, 0.0025 mol) is added, and the flask wall is washed with DMAc (1.5 ml) to remove any adhering IPC. After 15 minutes, TPC (1.5227 g, 0.0075 mol) is added, and the flask wall is again washed with DMAc (1.5 ml). The solution slowly gels. After propylene oxide (1.4 g, 0.024 mol) is added, the mixture is vigorously stirred to break up the gel and yield a viscous, homogenous solution. The mixture is stirred for another 4 hours at room temperature. After TGI (0.45 g) is added, the mixture is stirred for another two hours. The resulting solution can be directly cast into film.

Comparative Example 2

The polymer is prepared according to the procedure described in Example 3 without the addition of TGI.

Comparative Example 3

The polymer is prepared according to the procedure described in Example 4 without the addition of TGI.

Comparative Example 4

The polymer is prepared according to the procedure described in Example 5 without the addition of TGI.

Preparation and Characterization of Polymer Films

Using techniques known to those skilled in the art, the solids content and viscosity of the polymer solution can be adjusted for optimum film formation. For the preparation of small films, the solutions are poured on a flat glass plate, and the film thickness is adjusted using a doctor blade. After drying under reduced pressure at 60° C. for several hours, the film is further dried at 200° C. under protection of a dry nitrogen flow for 1 hour. The film is cured by heating at a temperature between approximately 220° C. and approximately 280° C. under vacuum or in an inert atmosphere. The film can also be produced continuously by a roll-to-roll process.

In one embodiment of this invention, the polymer solution is cast onto a reinforcing substrate like thin glass, silica or a microelectronic device. In this case, the process is adjusted so that the final polyamide film thickness is approximately 4 μm or more. The film is used in place and not removed from the substrate in free standing form. In some cases, the substrate may have an irregular and/or porous surface, such that the solution may level or penetrate the surface. Alternatively, the polymer solution can be cast on a carrier film such as polyethylene terephthalate. After the film is formed, it is stripped from the carrier film and laminated to a substrate like thin glass.

The CTE and Tg are determined with a thermal mechanical analyzer (TA Q 400 TMA). The thickness of the film is around 20 μm, and the load strain is 0.05N. In one embodiment, the CTE is less than approximately 20 ppm/° C., but it is understood that in other embodiments, the CTE is less than approximately 15 ppm/° C., less than approximately 10 ppm/° C., and less than approximately 5 ppm/° C. It is to be understood that within these embodiments the CTE can be less than approximately 19, 18, 17, 16, 15, 14, 13, 12, 11, 10, 9, 8, 7, 6, or 5 ppm/° C. The experimentally derived CTEs are the average of the CTEs obtained from room temperature to about 250° C.

Film transparency is measured by determining the transmittance of a 10 μm thick film from 400 to 750 nm with a UV-Visible spectrometer (Shimadzu UV 2450).

The solvent resistance of the film is determined by immersing it in a selected solvent for 30 minutes at room temperature. The film is considered solvent resistant if it is substantially free of surface wrinkles, swelling, or any other visible damage after immersion. The films are useful as substrates for flexible electronic devices.

The curing conditions used for the example copolyamides and the properties of their crosslinked films are shown in Table 3. The Table data illustrate the relative mild curing conditions and the beneficial effects of free pendant carboxyl groups on the polyamide on the curing process.

The embodiments have been described, hereinabove. It will be apparent to those skilled in the art that the above methods and apparatus may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A transparent aromatic copolyamide film comprising:
   (A) an aromatic copolyamide that is capable of being thermally crosslinked and having at least two repeat units of general formula (I) and (V):

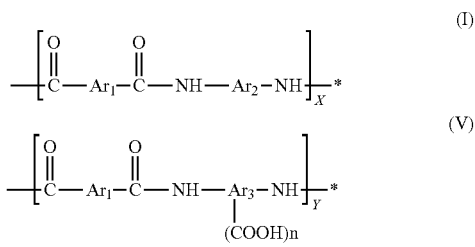

wherein X represents the molar percentage of the repeat structure (I) and Y represents the molar percentage of the repeat structure (V) and wherein the copolyamide is soluble in polar organic solvents in the absence of inorganic salts and can be solution cast into a clear film with a Tg higher than 300° C.; and $Ar_1$ is selected from the group consisting of:

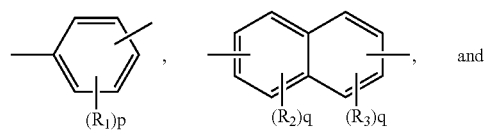

TABLE 3

Curing Conditions and Film Properties

| Curing Conditions | Example 3<br>250° C. ×<br>10 minutes | Example 4<br>240° C. ×<br>5 minutes | Example 5<br>220° C. ×<br>5 minutes | Comparative Example 2<br>Cannot be cured | Comparative Example 3<br>330° C. ×<br>5 minutes | Comparative Example 4<br>330° C. ×<br>10 minutes |
|---|---|---|---|---|---|---|
| Tg (° C.) | 325 | 327 | 335 | 336 | 334 | 350 |
| CTE (ppm/° C.) | 4.0 | 6.2 | 4.6 | 7.4 | 7.0 | 12.0 |
| T % at 400 nm | 82 | 83 | 83 | 82% | 80% | 81% |
| Solvent resistance | Yes | Yes | Yes | No | Yes | Yes |

-continued

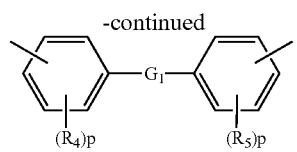

wherein p is 4, q is 3, and wherein $R_1$, $R_2$, $R_3$, $R_4$, $R_5$ are selected from the group comprising hydrogen; halogen; alkyl groups; substituted alkyl groups; cyano groups; thioalkyl groups; alkoxy groups; substituted alkoxy groups; aryl groups; substituted aryl groups; alkyl ester groups; substituted alkyl ester groups; and combinations thereof, wherein $G_1$ is selected from the group comprising a covalent bond; a $CH_2$ group; a $C(CH_3)_2$ group; a $C(CF_3)_2$ group; and a $C(CM_3)_2$ group, wherein M is selected from the group comprising a halogen; a CO group; an O atom; a S atom; a $SO_2$ group; a Si$(CH_3)_2$ group; a 9,9'-bisphenylenefluorene group; a substituted 9,9'-bisphenylenefluorene group; and an OZO group, wherein Z is selected from the group comprising a aryl group or substituted aryl group; a biphenyl group; a perfluorobiphenyl group; a 9,9'-bisphenylenefluorene group; and a substituted 9,9'-bisphenylenefluorene group, and wherein at least one of the $Ar_1$ groups in at least one of the repeat unit of (I) or at least one of the repeat unit of (V) is selected from the group consisting of:

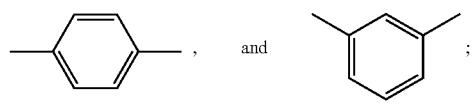

wherein $Ar_2$ is selected from the group consisting of:

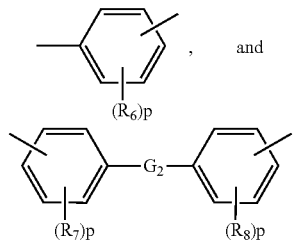

wherein p is 4, wherein $R_6$, $R_7$, $R_8$ are selected from the group comprising hydrogen; halogens; alkyl groups; substituted alkyl groups; cyano groups; thioalkyl groups; alkoxy groups; substituted alkoxy groups; aryl groups; substituted aryl groups; alkyl ester groups; substituted alkyl ester groups; and combinations thereof, wherein $G_2$ is selected from the group comprising a covalent bond; a $CH_2$ group; a $C(CH_3)_2$ group; a $C(CF_3)_2$ group; and a $C(CM_3)_2$ group, wherein M is selected from the group comprising a halogen; a CO group; an O atom; a S atom; a $SO_2$ group; a Si$(CH_3)_2$ group; a 9,9'-bisphenylenefluorene group; a substituted 9,9'-bisphenylenefluorene group; and an OZO group, wherein Z is selected from the group comprising a aryl group or substituted aryl group; a perfluorobiphenyl group; a 9,9'-bisphenylenefluorene group; and a substituted 9,9'-bisphenylenefluorene group, and wherein at least one of the $Ar_2$ groups in at least one of the repeat unit (I) is selected from the group consisting of:

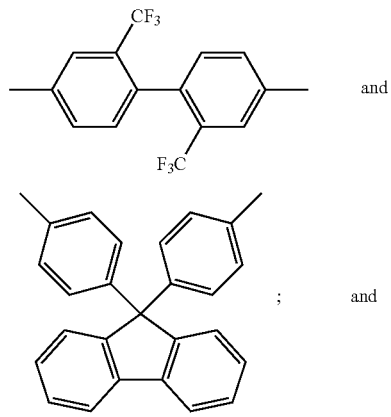

wherein $Ar_3$ is selected from the group comprising:

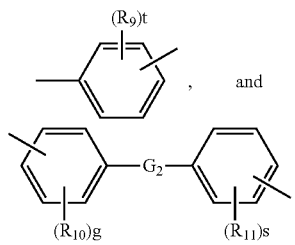

wherein t is 0 to 3, g is 0 to 4, and s is 0 to 4, wherein $R_9$, $R_{10}$, $R_{11}$ are selected from the group comprising hydrogen; halogens; alkyl groups; substituted alkyl groups; cyano groups; thioalkyl groups; alkoxy groups; substituted alkoxy groups; aryl groups; substituted aryl groups; alkyl ester groups; substituted alkyl ester groups; and combinations thereof, wherein $G_3$ is selected from the group comprising a covalent bond; a $CH_2$ group; a $C(CH_3)_2$ group; a $C(CF_3)_2$ group; and a $C(CM_3)_2$ group, wherein M is selected from the group comprising a halogen; a CO group; an O atom; a S atom; a $SO_2$ group; a Si$(CH_3)_2$ group; a 9,9'-bisphenylenefluorene group; a substituted 9,9'-bisphenylenefluorene group; and an OZO group, wherein Z is selected from the group comprising a aryl group; substituted aryl group; a biphenyl group; a perfluorobiphenyl group; a 9,9'-bisphenylenefluorene group; and a substituted 9,9'-bisphenylenefluorene group; and, wherein at least one $Ar_3$ group in at least one of the repeat units (V) is selected from:

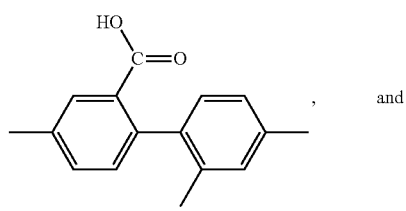

(B) a multifunctional epoxide selected from the group comprising the general structures (II), (III), and (IV):

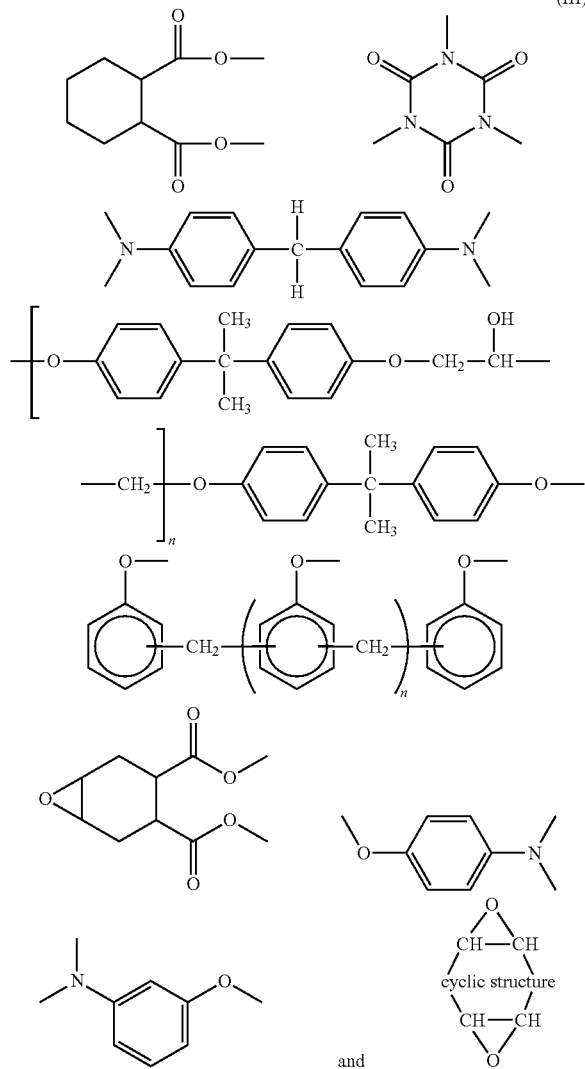

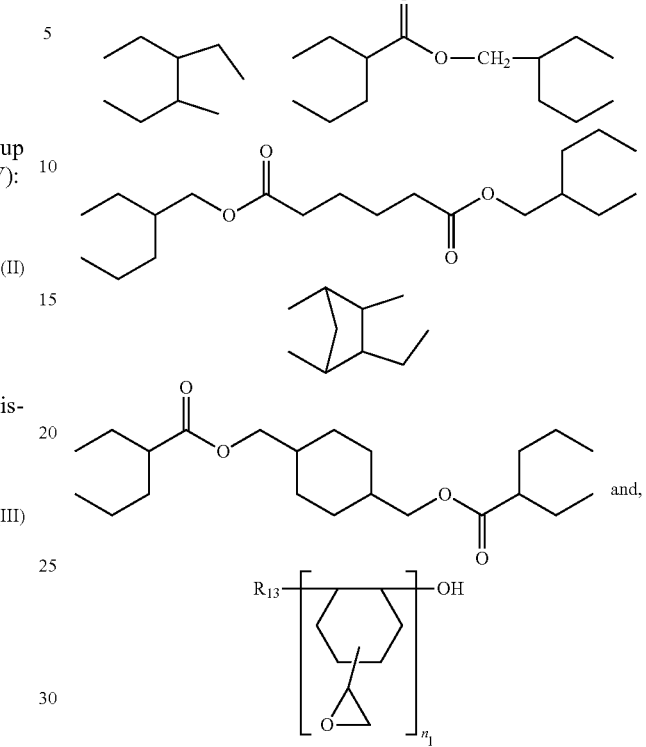

wherein n and $n_1 > 1$ and $R_{13}$ is an alkyl or aromatic group.

2. The film of claim 1, wherein the copolyamide contains multiple repeat units with structures (I) and (V).

3. The film of claim 1, wherein the copolyamide contains approximately 1 to approximately 10 mole % of the repeat unit containing at least one carboxyl group.

4. The film of claim 1, wherein the amount of multifunctional epoxide is between approximately 1 and approximately 10 wt % based on the weight of the copolyamide.

5. The film of claim 1, wherein the film thickness is greater than approximately 4 μm.

6. The film of claim 5, wherein the film thickness is greater than approximately 4 μm and less than approximately 100 μm.

7. The film of claim 5, wherein the film is approximately 10 μm thick and has a transmittance of >80% from 400 to 750 nm.

8. The film of claim 5, wherein a film is approximately 10 μm thick and has a transmittance of >85% at 550 nm.

9. The film of claim 1, wherein the film is heated under reduced pressure or under an inert atmosphere at a temperature that results in the film becoming solvent resistant.

10. The film of claim 9, wherein heating is conducted at less than approximately 250° C. for at least approximately 1 minute.

11. The film of claim 10, wherein heating is conducted between approximately 220° C. and approximately 250° C. for at least approximately 1 minute and less than approximately 30 minutes.

12. The film of claim 9, wherein the film thickness is greater than approximately 4 μm.

13. The film of claim 9, wherein the film thickness is between approximately 4 μm and approximately 100 μm.

14. The film of claim 12, wherein the film is approximately 10 μm thick and has a transmittance of >80% from 400 to 750 nm.

15. The film of claim 14, wherein the film is approximately 10 μm thick and has a transmittance of >85% at 550 nm.

16. The film of claim 5, wherein the film is adhered to a substrate and wherein the film thickness is greater than approximately 4 μm.

17. The film of claim 16, wherein the substrate is a glass film with a thickness greater than approximately 50 μm.

18. The film of claim 9, wherein the average coefficient of thermal expansion is less than approximately 20 ppm/° C. between 25° C. and 250° C.

19. The film of claim 18, wherein the average coefficient of thermal expansion is less than approximately 10 ppm/° C. between 25° C. and 250° C.

\* \* \* \* \*